(No Model.)
C. P. SCHULTZ.
DENTAL ENGINE.
No. 471,146. Patented Mar. 22, 1892.
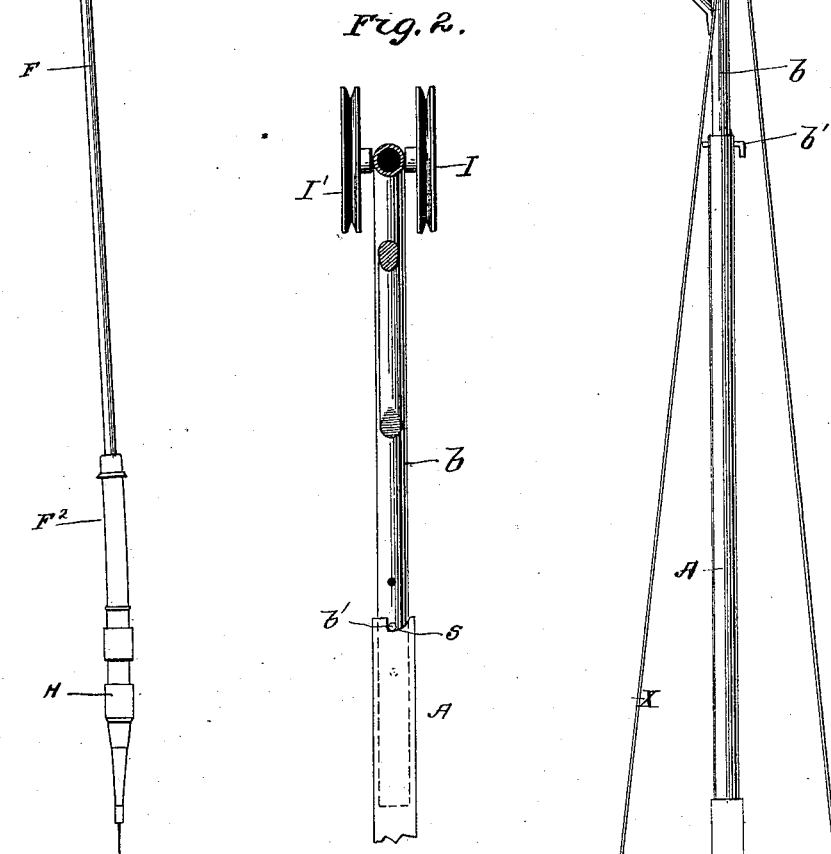

UNITED STATES PATENT OFFICE.

CHARLES P. SCHULTZ, OF NEW YORK, N. Y.

DENTAL ENGINE.

SPECIFICATION forming part of Letters Patent No. 471,146, dated March 22, 1892.

Application filed July 7, 1891. Serial No. 398,666. (No model.)

*To all whom it may concern:*

Be it known that I, CHARLES P. SCHULTZ, a resident of New York city, county and State of New York, have invented certain new and useful Improvements in Dental Engines, of which the following is a specification.

The object of my invention is to construct a dental engine in which the tool-operating shaft shall have a free range of movement of ample extent in all directions, so as to afford every facility for work to the operator. To this end I organize a machine as follows: From the upright or standard of the engine an arm movable horizontally about a vertical pivot or bearing in the standard of the engine carries at its end a bracket which is connected therewith by a universal joint that affords a wide and ample range of motion in all directions. The tool-driving shaft, which may be entirely a flexible shaft or partly rigid and partly flexible, has its bearings in this bracket and carries a pulley driven by an endless band which passes horizontally over pulleys located substantially in line with the standard of the engine and then down and around the driving-wheel. The bracket in which the tool-driving shaft has its bearing is provided with anti-friction guide-rolls, by means of which the band is always kept in engagement with the pulley on the tool-driving shaft, no matter into what position the bracket may be moved by the operator to bring the hand-piece and tool into convenient position for work. The horizontal arm is so arranged that when the operator drops the hand-piece the arm by gravity swings to one side out of the way of the operator.

In the accompanying drawings, Figure 1 is an elevation of so much of a dental engine as is necessary to illustrate my invention. Fig. 2 is a detailed sectional view on a somewhat larger scale, and Fig. 3 a perspective view of the tool-shaft-supporting bracket.

In the drawings the base of the engine, the treadle, and the driving-wheel are omitted.

In the construction shown the upright or standard A of the engine is made tubular at its top $a$ and receives the short arm $b$ of a right-angular frame which is supported therein by a cross-pin $b'$, that permits it to turn horizontally. The horizontal arm B of this frame may therefore be moved horizontally to bring the apparatus into convenient position for work. In the construction shown the end of the arm B is tubular and receives a short pin or shaft C, which is seated therein so as to turn freely.

The tool-shaft-supporting bracket D is pivoted to the outer end of the shaft C by a transverse pivot-pin $d$, a universal joint having a wide range of movement in all directions being thus provided. The tool-shaft F has its bearings in the two arms $f f$ of the bracket D and carries between said arms its grooved driving-pulley F'. On each side of the bracket D and in suitable relation to the driving-pulley F' is a pair of guide-rollers $g$ $g$, mounted in bearings in the bracket and in a small yoke G, projecting therefrom. These rolls serve as guides for the endless driving-band, and the space between the rolls of each pair is only sufficient to allow a perfectly free passage of the band. These rolls prevent friction on the driving-belt and consequent loss of power and reduce the wear of the belt to a minimum.

The portion marked F of the tool-shaft, and which may be of any desired length, is shown as a rigid shaft. At its end it carries a short section F² of flexible shafting, with which the hand-piece H is connected in the ordinary manner.

Grooved pulleys I I are shown mounted on each side of the frame B $b$ at the angle thereof and substantially in line with the standard A. The endless driving-band X passes from the driving-wheel (not shown) over the pulleys I I and between the guide-rolls $g g$ around the grooved pulley F' of the tool-driving shaft. Obviously it is immaterial whether the arm B be rigid as to vertical movement or whether it be capable of being raised or lowered. The cross-pin $b'$, which may be passed through any one of the series of apertures in the rod $b$ in order to adjust the height of the apparatus, is seated in notches $s$ in the edge of the tubular shaft $a$. These notches have a square shoulder on one side, but are inclined on the other, as seen in Fig. 2. The purpose of this arrangement is to permit the ready movement of the arm B toward the operator, and when the hand-piece is released and the arm B pushed away from the operator the pin $b'$ finally strikes the square shoulders of the notches $s$ and stops the further movement of the arm B.

The tool-shaft $F$ $F^2$ normally hangs pendent, as shown in the drawings, at a sufficient distance from the standard A to allow ample room for the convenient movement of the operator. As the operator moves the hand-piece into the varying positions required for his work the bracket D, turning upon the universal connection, moves freely in any direction required, and at the same time the driving-belt is always held in proper engagement with the pulley $F'$, because no matter to what angle the bracket may be turned the guide-rolls $g$, over which the belt runs, always present the belt properly to the groove in the pulley, and the parts are so related that the belt is not materially slackened in any position into which the bracket D may be turned.

What I claim as my invention is—

The combination of the standard, the laterally-projecting arm, a bracket arranged at the end of the arm, a universal joint between the bracket and arm, a tool-driving shaft having its bearings in the bracket, its driving-pulley, guide-rolls for maintaining a proper relation between said pulley and its driving-belt, and the pulleys I I, substantially as set forth.

In testimony whereof I have hereunto subscribed my name.

CHAS. P. SCHULTZ.

Witnesses:
 EDWARD C. DAVIDSON,
 M. A. WALSH.